United States Patent [19]
Verrier et al.

[11] Patent Number: 5,349,139
[45] Date of Patent: Sep. 20, 1994

[54] ARCHITECTURE FOR COMMUNICATION OF REMOTE DEVICES TO A DIGITIZING DISPLAY

[75] Inventors: Guy F. Verrier, Boca Raton, Fla.; Frank L. Stein, Vienna, Va.; Robert L. Donaldson, Annapolis, Md.

[73] Assignee: International Business Machines, Armonk, N.Y.

[21] Appl. No.: 969,864

[22] Filed: Oct. 30, 1992

[51] Int. Cl.⁵ .............................................. G08C 21/00
[52] U.S. Cl. ...................................... 178/19; 345/179; 345/158
[58] Field of Search ............... 340/706, 709, 710, 712, 340/707, 708, 825.69, 825.72; 178/18, 19; 382/59; 345/179, 158, 180, 157, 169, 174, 177, 173

[56] References Cited

U.S. PATENT DOCUMENTS

| | | | |
|---|---|---|---|
| 4,686,332 | 8/1987 | Greanias et al. | |
| 4,786,764 | 11/1988 | Padula et al. | |
| 4,786,765 | 11/1988 | Yamanami et al. | 78/19 |
| 4,841,368 | 6/1989 | Rumbolt et al. | 340/825.72 |
| 4,992,630 | 2/1991 | Mletzko | 178/18 |
| 5,007,085 | 4/1991 | Greanias et al. | |
| 5,012,049 | 4/1991 | Schier | 340/707 |
| 5,012,349 | 4/1991 | de Fay | 358/473 |
| 5,025,484 | 6/1991 | Yamanari et al. | 382/59 |
| 5,034,598 | 7/1991 | Poland | 340/707 |
| 5,107,541 | 4/1992 | Hilton | 178/18 |
| 5,117,071 | 5/1992 | Greanias et al. | |
| 5,136,285 | 8/1992 | Okuyama | 340/825.72 |
| 5,229,744 | 7/1993 | Ogura | 340/311.1 |
| 5,243,149 | 9/1993 | Comerford et al. | 178/18 |

Primary Examiner—Tommy P. Chin
Assistant Examiner—A. Au
Attorney, Agent, or Firm—John E. Hoel

[57] ABSTRACT

An architecture for communication of remote devices to a digitizing display includes a contact sensing mechanism and a position sensing mechanism whose outputs are multiplexed for transmission from the stylus to an antenna located proximate to the digitizing display. The digitizing display also includes a transmitter for transmitting information from a pen-based computer system to the stylus for storage or utilization in the stylus.

11 Claims, 6 Drawing Sheets

ARCHITECTURE FOR COMMUNICATION OF REMOTE DEVICES TO A DIGITIZING DISPLAY

BACKGROUND OF THE INVENTION

1. Technical Field

The invention disclosed broadly relates to data processing systems and more particularly relates to improvements in input/output devices for pen-based computer systems.

2. Related Patents and Patent Applications

The following patents and patent applications are assigned to the IBM Corporation and are incorporated herein by reference.

U.S. Pat. No. 4,686,332 entitled "Combined Finger Touch and Stylus Detection System for Use on the Viewing Surface on a Visual Display Device," by Evon C. Greanias, et al.

U.S. Pat. No. 5,007,085 entitled "Remotely Sensed Personal Stylus," by Evon C. Greanias, et al.

U.S. Pat. No. 5,117,071 entitled "Stylus Sensing System," by Evon C. Greanias, et al.

Copending U.S. patent application Ser. No. 07/778,431, filed Oct. 16, 1991 entitled "Touch Overlay for Improved Touch Sensitivity," by Evon C. Greanias, et al.

Copending U.S. patent application Ser. No. 07/351,227, filed May 15, 1989 entitled "Flat Touch Screen Workpad for a Data Processing System," by Gordon W. Arbeitman, et al.

3. Background Art

Pen-based computer systems have been described in the prior art, for example in the above referenced U.S. Pat. No. 4,686,332 by Greanias, et al. In that system, a touch overlay membrane is positioned over the viewing surface of a display device such as a computer monitor, for interacting with a pickup stylus. The pickup stylus described in the '332 patent is connected by means of a wire to the pen-based computer system. The pen-based computer system generates a radiative signal in the touch overlay. The radiative signal is picked up by the stylus and sent back over the wire to the pen-based computer. The computer then calculates the relative X-Y position of the stylus with respect to the overlay. The relative proximity Z of the stylus to the overlay is determined by the signal amplitude picked up by the stylus from the electromagnetic energy radiated from the overlay. An improvement in the stylus pickup antenna is described in the above cited U.S. Pat. No. 5,117,071 by Greanias, et al. In the '071 patent, the antenna configuration in the tip of the stylus is a small sphere, whose shape enables a uniform signal strength to be picked up without regard for the relative orientation of the stylus with respect to the planar surface of the overlay. A further improvement has been made to the stylus by eliminating the cable connection between the stylus and the pen-based computer system, as is described in U.S. Pat. No. 5,007,085 by Greanias, et al. In the '085 patent, the signal detected by the stylus antenna which has been picked up from the electromagnetic radiation emitted by the overlay, is converted into a second signal which is transmitted either by infrared radiation, microwave radiation or radio frequency radiation at a different frequency, from the stylus back to an electromagnetic detector coupled to the pen-based computer system. Another improvement to pen-based computer systems is described in the above referenced copending U.S. patent application Ser. No. 07/351,227, filed May 15, 1989 by Arbeitman, et al. In the Arbeitman, et al. patent application, a flat touch screen workpad is substituted for the combination of the computer display monitor and touch overlay membrane. In the Arbeitman, et al. patent application, the radiative pickup stylus is connected by means of a wire to the flat touch screen workpad, for receiving the electromagnetic radiation emanated from the overlay membrane, the wire transferring the detected signal from the pickup stylus back to the electronics contained in the flat touch screen workpad.

In the description of the invention contained herein, the term "digitizing display" will be used to generally refer to either the combination of a computer display monitor and touch overlay membrane described in the '085 patent or alternately, the workpad display and overlay described in the Arbeitman, et al. patent application.

The above cited U.S. Pat. No. 5,007,085 entitled "Remotely Sensed Personal Stylus," by Evon C. Greanias, et al., describes a pen-based computer system which has a digitizing display which radiates electromagnetic signals which are picked up by a remotely sensing personal stylus. The antenna in the tip of the stylus picks up the electromagnetic signals radiated from the display overlay, and converts those signals into a suitable form for retransmission back to the pen-based computer system. The relative signal strength of the signals picked up by the stylus is used to infer the relative separation distance Z of the tip of the stylus with respect to the overlay. The converted signals are transmitted back to the pen-based computer system by means of a transmitting circuit and transmitting antenna within the stylus. The technique for determining contact between the stylus tip and the surface of the overlay, is by measuring the relative signal strength of the electromagnetic signal picked up by the tip of the stylus.

A problem with this prior art is that the detection of actual touchdown of the stylus onto the workpad surface is not very sensitive. Consider in normal handwriting how the writer's hand pressure varies during the course of writing a signature. The pressure applied by the pen to the paper varies over the course of inscribing the signature on the paper and sometimes includes a slight raising of the pen from the surface of the paper. The process of writing a signature on a digitizing display by means of a radiative pickup stylus, does not faithfully reproduce the intended shape on the display screen. When the stylus is raised slightly from the surface of the digitizing display, the separation of the stylus tip from the surface will not be detected in prior art systems. What results is spurious traces and artifacts which remain in the "inked" depiction of the user's signature because the system cannot detect the actual small separation of the stylus from the surface of the digitizing display.

OBJECTS OF THE INVENTION

It is therefore an object of the invention to improve the accuracy of representing handwritten characters and script in a pen-based computer system.

It is another object of the invention to more accurately detect the small but real separation of a stylus from the surface of a workpad in a pen-based computer systems.

It is a further object of the invention to provide a data processing architecture for transferring digital information between a stylus and a pen-based computer system.

It is yet another object of the invention to provide a data processing system for communicating contact information between a stylus and a pen-based computer system.

It is still a further object of the invention to provide a data processing system for transmitting from a stylus, stored digital information to a pen-based computing system.

It is yet a further object of the invention to provide a stylus in a pen-based computer system, which receives information and relays it to the pen-based computer system.

It is still a further object of the invention to provide a stylus in a pen-based computer system, which picks up images of characters and performs character recognition and which outputs the recognized characters to the pen-based computer system.

It is still a further object of the invention to provide a stylus in a pen-based computer system, which includes storage sufficient to receive from the pen-based computer system digital information for storage therein.

It is yet a further object of the invention to provide a stylus in a pen-based computer system, having storage which will store information from the pen-based computing system, enabling transport thereof to another location.

SUMMARY OF THE INVENTION

These and other objects, features and advantages are accomplished by the architecture for communications of remote devices in a two-way digitizing display. In accordance with the invention, a stylus in a pen-based computer system includes a contact detection mechanism such as a pressure transducer which is connected through to an analog-to-digital converter to a multiplexer inside the stylus. Also connected to the multiplexer is a position detector such as a radiative pickup mechanism and signal strength detector, which provides second analog-to-digital converted bit stream to the multiplexer. The multiplexed signal which includes information relating to stylus contact and to stylus position, is then passed through a transmitter and transmitted by electromagnetic radiation to a nearby digitizing display.

The digitizing display can be for example, a transparent overlay on a computer display monitor or a workpad, which includes an array of radiating wires embedded therein. The pattern of signals emitted by the radiating wires will be picked up by the stylus and used to infer the relative position of the stylus over the area of the overlay. In accordance with the invention, the multiplexed signal containing information about the contact of the stylus and also about the X-Y position of the stylus, is transmitted from the stylus to an antenna embedded in the digitizing display. The signal is decoded by electronics in the digitizing display, and is forwarded to the pen-based computer system. In accordance with the invention, the receiving antenna is embedded in the digitizing display and is suitable for the receipt of the multiplexed signal transmitted from the stylus.

Further in accordance with the invention, an electromagnetic signal receiver is included in the stylus capable of receiving electromagnetic signals transmitted from the antenna embedded in the digitizing display. In this manner, information originating in the pen-based computer system can be transmitted from the digitizing display through the embedded antenna to the receiver in the stylus for utilization therein.

Still further in accordance with the invention, the stylus can include a read/write storage memory, capable of storing the digital information included in the signal emitted from the antenna embedded in the digitizing display and received by the receiver in the stylus. Still further in accordance with the invention, a read-only storage device can be included in the stylus which stores a password, personal identification number, or other security information. In addition, an offset value in units corresponding to force, can be stored in the ROM, to zero out the unloaded force reading. The security information can be transmitted from the stylus to the antenna embedded in the digitizing display for use in validating the identity of the stylus or of the user of the stylus, by the pen-based computer system.

Other forms of information transducers can be included in the stylus such as microphone or a bar code reader or a character recognition device. Digitized alphanumeric character strings can be produced from these input transducers and the resultant alphanumeric string can be transmitted by the transmitter in the stylus to the embedded antenna in the digitizing display for use by the pen-based computer. The architecture allows the stylus to receive a query, such as "Return the PIN number" and the stylus will respond by transmitting the number to the workpad.

Still further in accordance with the invention, an enunciator such as a beeper or a vibrator or other output device, including an LCD character display, can be included in the stylus. Alphanumeric information transmitted from the digitizing display by means of the embedded antenna and received by the receiver in the stylus, can be manifested by the enunciator device in the stylus.

It is still another object of the invention to provide a portable electromagnetic receiver tuned to receive signals from the embedded antenna in the digitized display, for receiving alphanumeric character strings or other information from the pen-based computer system by way of the antenna in the digitizing display.

DESCRIPTION OF THE DRAWINGS

These and other objects, features and advantages will be more fully appreciated with reference to the accompanying figures.

DISCUSSION OF THE PREFERRED EMBODIMENT

Figure 1:
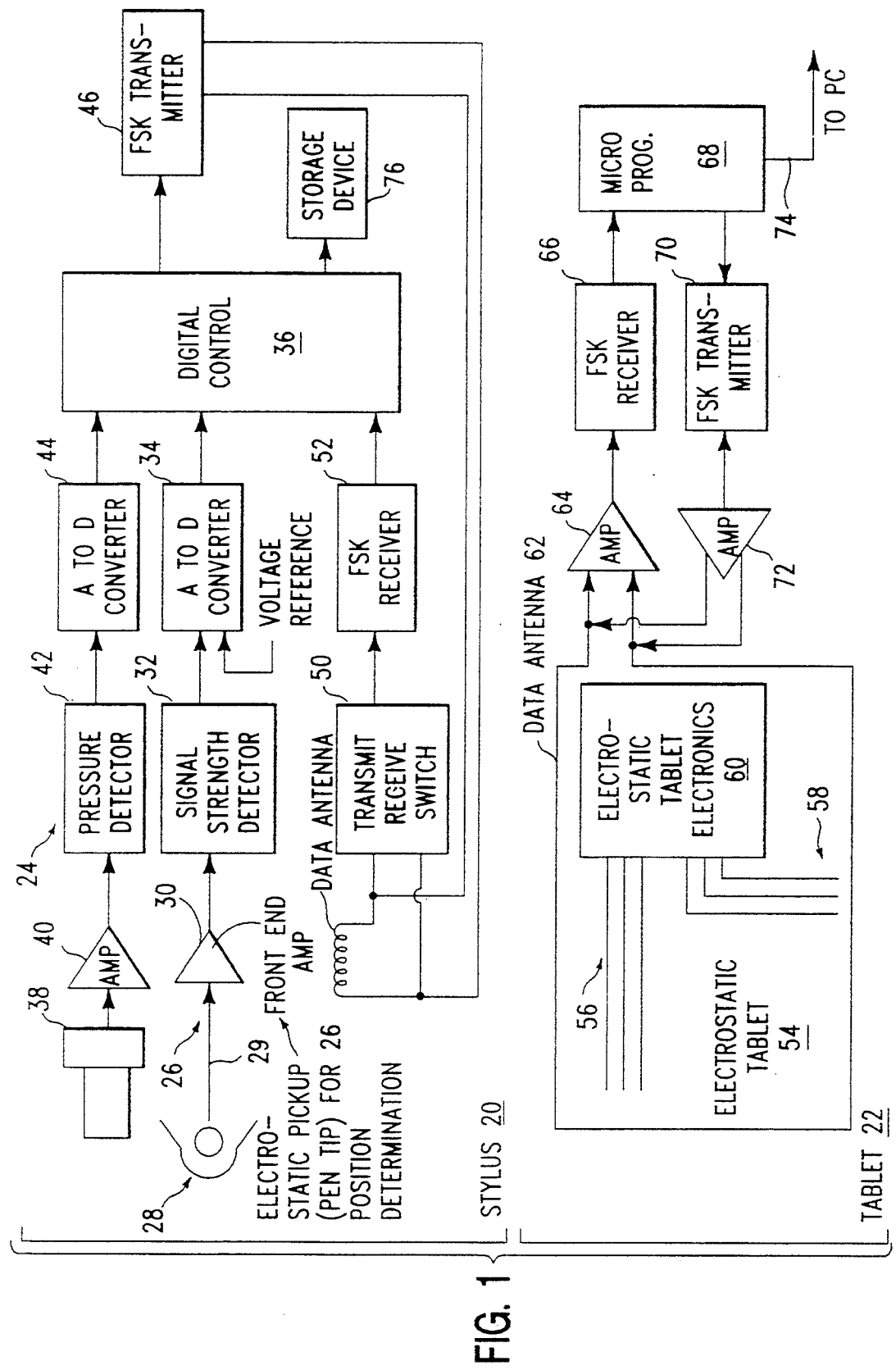
FIG. 1 is an overall architectural diagram of the invention.

FIG. 1 is an overall architectural diagram of the architecture for communications of remote devices to a digitizing display. The digitizing display which is described herein is described in greater detail in the commonly assigned U.S. Pat. No. 5,007,085 by Greanias entitled "Remotely Sensed Personal Stylus" and U.S. Pat. No. 4,764,885 by Greanias entitled "Proximity Sensing Blinking Cursor Feature and U.S. Pat. No. 4,686,332 by Greanias entitled "Thin Plastic Overlay for Finger and Stylus Display Input."

The architecture shown in FIG. 1 is divided in two principal parts. The first part is the stylus 20 and the second part is the digitizing display 22. The stylus 20 includes a first branch which can be for example branch 24 which is a mechanical contact detecting branch. The second branch can be for example branch 26 which is a position detecting branch.

Figure 2:
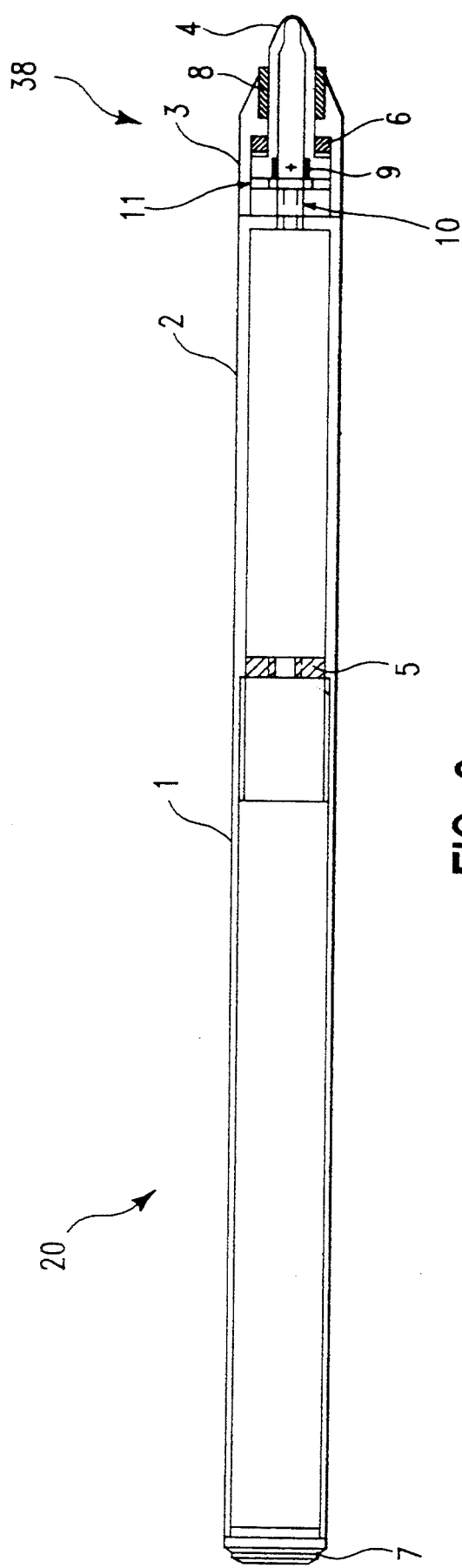
FIG. 2 is a mechanical side view of an example stylus which includes a pressure-sensing mechanism in one end thereof for picking up the pressure applied by the stylus to the surface of a digitizing display.
Figure 7:
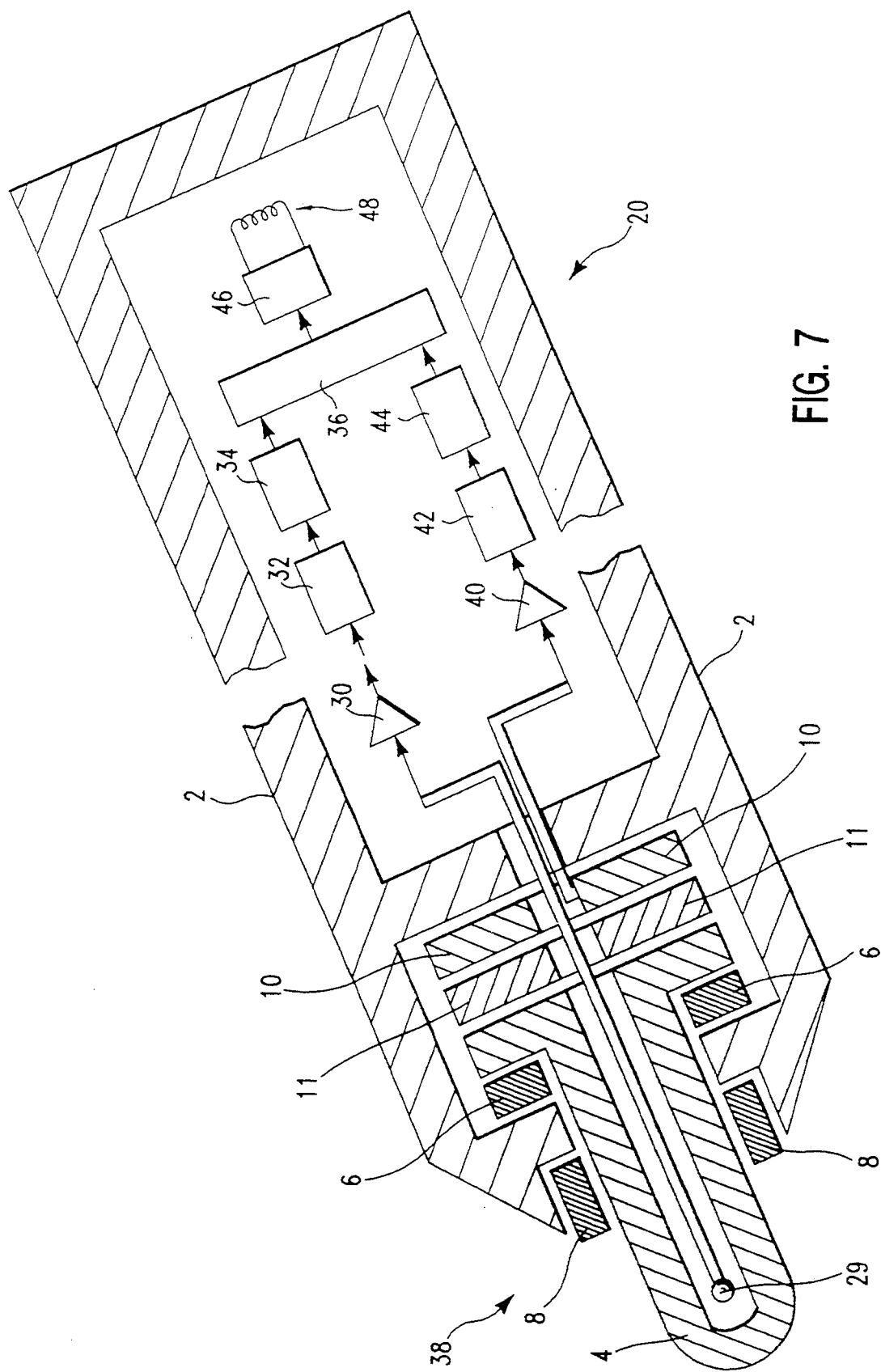
FIG. 7 is a more detailed cross-sectional and schematic view of the stylus 20.

The contact detecting branch 24 can include a pressure detector 38, which is shown in greater detail in FIG. 2 and FIG. 7. Connected to the pressure detector 38 is a signal amplifier 40 which has its output connected to the pressure detector circuitry 42. The output of pressure detector circuitry 42 goes to the analog-to-digital converter 44 which outputs a digital number representing the pressure applied by the pressure detecting mechanism 38 to the front surface of the electrostatic tablet 54 in FIG. 1. The output of the analog-to-digital converter 44 is then applied to a first input of the multiplexer 36.

FIG. 2 and FIG. 7 show the stylus 20 and in particular, show the details of the mechanical contacting mechanism 38. A pressure transducer 10 includes a layer formed of a force sensitive resistant (FSR) transducer material, for example, as manufactured by Interlink Electronics, Santa Barbara, Calif. Such material changes its resistance when compressed by the application of a force on its surface. Electrically conductive electrodes on the printed circuit board 11 contact separated portions of the surface of the FSR transducer layer 10 such that a complete circuit is formed between the conductors on the printed circuit board 11, by way of the FSR transducer layer 10. The electrodes on the printed circuit board 11 are pressed against the transducer 10 to complete the electrical circuit.

When the operational amplifier 40 shown in FIG. 1 is turned on but the stylus 20 is not yet in use, a voltage will be applied across the FSR transducer 10 by way of the stylus terminals and conductive electrodes 11. Then, when the tip 4 of the stylus 20 is pressed against the tablet surface 54, the FSR transducer layer 10 is compressed between the surfaces of two opposing parts. The first part is displaceable as the stylus tip 4, which is slightly displaced when pressure is exerted on the stylus tip 4. The other part of the compression mechanism is stationary and is the printed circuit board 11 which is held in place by the housing 2 shown in FIG. 2 and FIG. 7. When the FSR transducer layer 10 is compressed, its electrical resistance changes such that a current and/or voltage change is produced at the output connected to the operational amplifier 40. This change is used to trigger the pressure detector 42, to acquire the pressure sensing data. Also included within the hollow tip 4 of the stylus 20 of FIG. 2 and FIG. 7, is the pickup antenna 29 shown in FIG. 1, which is radiatively coupled to the radiating electrodes 56 and 58 of the tablet 54.

In the position detecting branch 26 is the antenna device 29 described in U.S. Pat. No. 5,117,071 cited above, which picks up electromagnetic signals radiated from the conductors 56 and 58 in the electrostatic tablet 54. The output of the antenna 29 is coupled through the amplifier 30 to the signal strength detector 32. The output of the signal strength detector 32 is then applied to the analog-to-digital converter 34. The output to the analog-to-digital converter 34 is a digital representation of the signal strength detected by the antenna 29 for the signals radiated from the conductors 56 and 58 in the electrostatic tablet 54. The signals radiated from the electrostatic tablet 54 represent positional information when detected by the antenna 29, as described in U.S. Pat. No 5,686,332, cited above.

The output of the signal strength detector 32 is applied to the analog-digital converter 34, which in turn outputs a digital representation of the relative position of the stylus 20 over the electrostatic tablet 54, as a number to a second input to the multiplexer 36.

Figure 4:
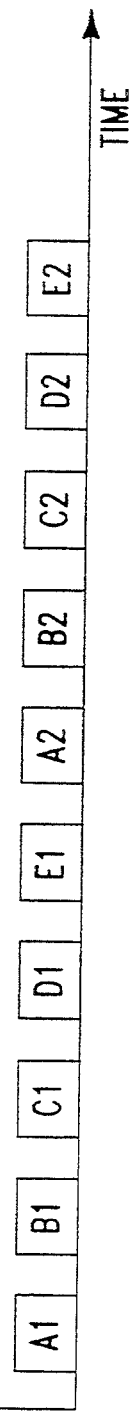
FIG. 4 is a waveform diagram of the output from multiplexer 36' to the transmitter 46 in FIG. 3.
Figure 3:
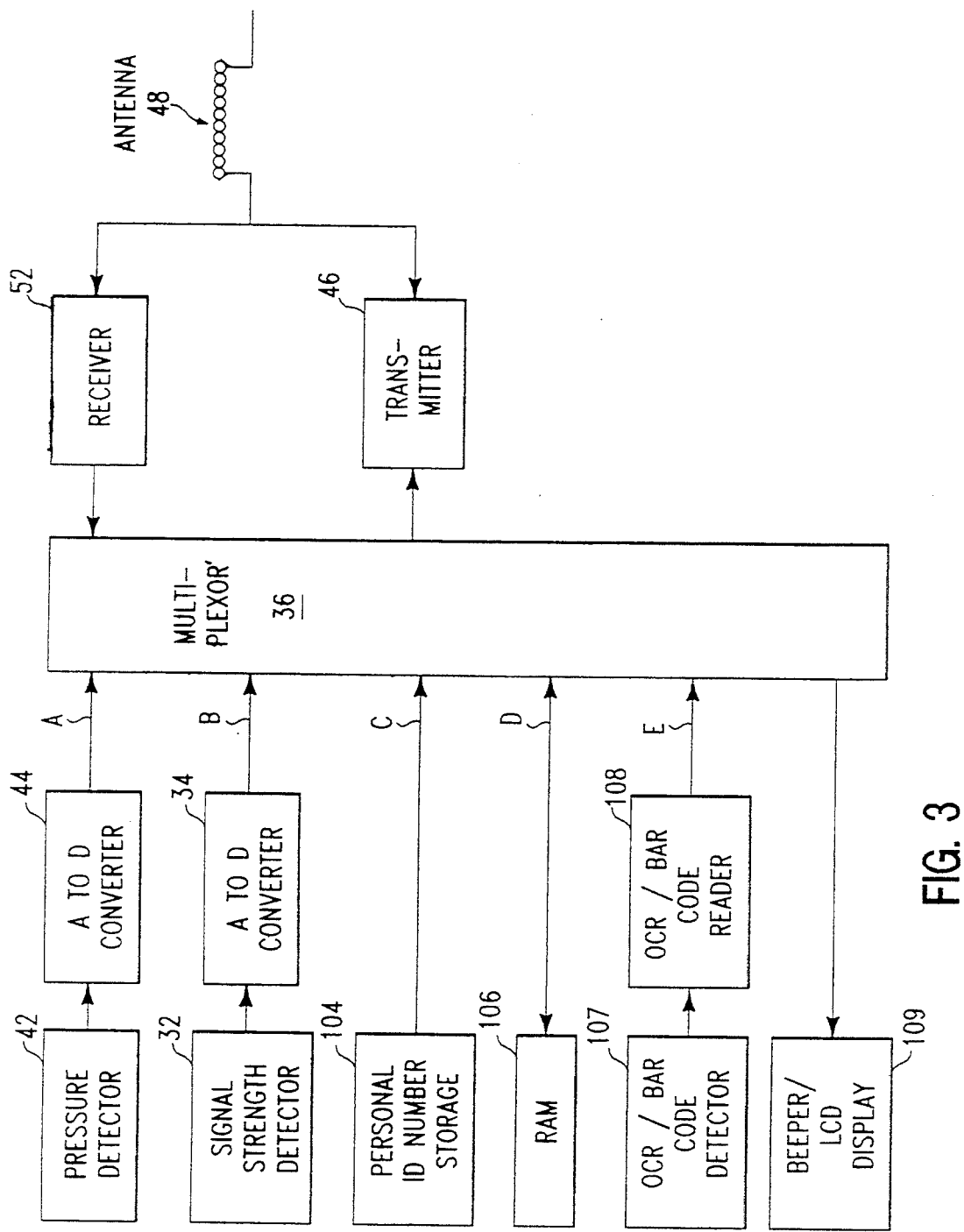
FIG. 3 is a schematic block diagram of an example plurality of sources of digital information which can be multiplexed and transmitted from the stylus to an antenna embedded in an associated digitizing display.

The multiplexer 36 is shown as multiplexer 36' in another schematic diagram in FIG. 3. There it is seen that the multiplexer 36 or 36' generates a time-divided sequence of numbers in data frames as shown in FIG. 4, which are applied to the transmitter 46. The multiplexer can be controlled to change the order and content of the data stream. Returning back to FIG. 1, the multiplexed data stream of numbers alternately output from the pressure detector A-to-D converter 44 and the position detecting A-to-D converter 34 are applied to the frequency shift key (FSK) transmitter 46. The output of the transmitter 46 is then applied to the antenna 48 in the stylus 20. The stylus 20 then radiates the information which includes the applied pressure on the pressure detecting mechanism 38 and the X-Y position information from the antenna device 29. This data stream is radiated from the antenna 48 and is detected, in accordance with the invention, by the embedded antenna 62 in the digitizing display 22.

FIG. 7 shows a cross-sectional view of the stylus 20, and includes a schematic representation of the pressure sensing and position sensing electronics within the stylus. This includes the amplifiers 30 and 40, the detectors 32 and 42, the A-to-D converters 34 and 44, the multiplexer 36, the transmitter 46 and the antenna 48.

FIG. 3 shows the multiplexer now depicted as 36', which can replace the multiplexer 36 in FIG. 1. The multiplexer 36' in FIG. 3 has five input devices connected to it, the pressure detector 42, the signal strength detector 32, the personal identification number storage 104, the RAM 106 and the optical character recognition device/bar code reader 108. The pressure detector 42 transfers the applied pressure signal input from the tip 4 of stylus 20 to the analog-to-digital converter 44, which outputs a digital representation of the applied pressure on input A to the multiplexer 36'. The signal strength detector 32 receives X-Y related position information and Z separation information from the antenna 29 and applies it to the analog-to-digital converter 34. The converter 34 outputs a digital representation of the X-Y position and Z separation over the input B to the multiplexer 36'. The personal identification number storage 104 can be a read-only storage or a writable EPROM which outputs an identifying digital number on the input C to the multiplexer 36'. The RAM 106 can store information which is output as digital information to the input D to the multiplexer 36'. The optical character recognition device and bar code reader device 108 receives OCR or bar code signals from detector 107 and transfers digital information representing the characters read, and the digital representation is output over the input E to the multiplexer 36'.

FIG. 4 shows a waveform diagram of the multiplexed data stream output from the multiplexer 36' of FIG. 3 to the transmitter 46 for transmission over the antenna 48 in the stylus 20. The waveform diagram of FIG. 4 shows the multiplexed outputs A1, B1, C1, D1 and E1 during a first time frame, which are respectively output over the lines A, B, C, D and E to the multiplexer 36' of FIG. 3. The waveform diagram of FIG. 4 also shows a second time frame during which a similar sequence of data words A2, B2, C2, D2 and E2 are respectively output on the inputs A, B, C, D and E in FIG. 3.

Also shown in FIG. 3 is an annunciator 109 which can be a beeper, a vibrator or a liquid crystal display device, which has an output connected to it from the multiplexer 36'. Information can be displayed on the annunciator device 109 which is information received on the antenna 48 in the stylus and transferred through the receiver 52 and the multiplexer 36'.

The digitizing display 22 can be, for example, a transparent overlay superimposed on a conventional display monitor or a workpad coupled to a pen-based computer system. Included in the overlay, for example, can be the embedded antenna 62. Alternately, the antenna 62 can be proximate to the transparent overlay, but sufficiently close to enable detection of the multiplexed data stream transmitted from the antenna 48 of the stylus 20.

In accordance with the invention, the stylus 20 transmits by means of the antenna 48 information from the pressure detector 38 and the X-Y detector 29 to the antenna 62 in the digitizing display 22. Antenna 62 in the digitizing display 22, is coupled through the amplifier 64 to the FSK receiver 66. The output of the receiver 66 is then applied to a microprocessor 68. The microprocessor 68 can, for example, strip out the respective numbers representing the contact pressure detected by the detector 38 in the stylus 20 and separately, the number representing the X-Y position location of the stylus with respect to the electrostatic tablet 54. The numerical values can then be forwarded by the microprocessor 68 to the pen-based computing system 74.

Further in accordance with the invention, the stylus 20 can include a transmit/receive switch 50 which alternately connects the antenna 48 to either the FSK transmitter 46 or alternately to the FSK receiver 52 in the stylus 20. If the receiver 52 is connected to the antenna 48, the the stylus 20 can receive information in the form of electromagnetic signals radiated from the antenna 62 in the digitizing display 22. In this mode of operation, the FSK transmitter 70 transfers digital information from the microprocessor 68 to the amplifier 72, which applies the digital information over the antenna 62 of the digitizing display 22. The radiated electromagnetic signals from the antenna 62 containing the digital information from the microprocessor 68, is radiated to the antenna 48 in the stylus 20. The antenna 48 is then connected through the transmit/receive switch 50 to the FSK receiver 52, which applies the received digital information from the digitizing display 22 to the multiplexer 36. The multiplexer 36 will then apply the digital information to for example a storage device 76 in the stylus 20 or the annunciator 109 or the RAM 106 in FIG. 3. In this manner, digital information can be transmitted from the digitizing display 22 and received and stored in the stylus 20.

The side cross-sectional view of the stylus 20 shown in FIG. 2 and in FIG. 7 provides a detailed illustration of the mechanical parts of the pressure contacting portion 38. The stylus 20 is designed to precisely determine when the tip 4 is in mechanical contact with the electrostatic tablet 54 and when it is not in mechanical contact. However, the tip contacting portion 38 can also output several intermediate states of pressure. For example, the contact portion 38 of the stylus 20 can output 16 levels represented by four binary bits of pressure. The 16 levels of pressure can be used for applications such as shading of drawings, moving a cursor fast or slow, drawing heavy or light lines, and other drawing applications. The construction of the stylus 20 shown in FIG. 2 and FIG. 7 enables very small longitudinal displacement of the probe tip 4 within the housing 2 to detect a range of force from 30 grams to 300 grams. The stylus 20 can use a transducing material such as the force sensing resistor made by Interlink, described above.

The design of the contact portion 38 shown in FIG. 2 eliminates friction which would prevent the detection of low pressure. It also allows the stylus to relax back to its non-contact state, to avoid confusing readings when detecting the tip 4 is just coming off the surface of the display 54. The design shown in FIG. 2 also provides a very low pre-load pressure on the force sensing resistor 10 so that the dynamic range of the force sensing resistor 10 is maximized. In addition, the design of the contact portion 38 in FIG. 2 minimizes the detection of lateral rather than axial or longitudinal forces.

The tip 4 of FIG. 2 floats freely between the cone 3 and a brass shaft which holds the ball of the electrostatic sensor 29, as described in the above referenced U.S. Pat. No. 5,117,071. Bushings 8 and 9 are made of tetrafluoroethylene to minimize friction.

The gasket 6 is made of very low durometer rubber to establish a minimum amount of pre-load pressure. Without some pre-load pressure, the tip 4 will move around inside the cone 3 and create false readings as the stylus 20 is moved, rotated, shaken or tilted. However, if the gasket 6 is too stiff, this will reduce the sensitivity of the stylus to the detection of low forces and reduce the dynamic range of the stylus.

The tip 4 detects axial forces, along the line of the axis of the housing 2. The pen tip 4 contains the electrostatic sensing element 29 used for X-Y position determination, as is described in U.S. Pat. No. 5,117,071 and shown in FIG. 7. The force sensing resistor 11 is the type used in membrane switch devices. The force sensing resistor 10 meets with a small circular printed circuit board 11 which is used to make appropriate contact with the force sensing resistor 11.

The force sensing resistor 10 generates a variable resistance which depends on the pressure applied to it by the tip. The force sensing resistor 10 can be biased by a reference voltage source for example 1.4 volts, so that a differential voltage across the device can be amplified by the operational amplifier 40. The output voltage can be adjusted to match the output voltage for the range of X-Y positioning of the amplifier 30 for the electrostatic pickup device 29. In this way, a common analog-to-digital conversion circuit could be used to digitize both the pressure output by the pressure detector 42 and the signal strength output by the signal strength detector 32 in FIG. 1. In such an alternate embodiment, appropriate switching between the pressure detector 42 and the signal detector 32 with the single analog-to-digital converter could be accomplished to perform an analog multiplexing of the analog signal input to the common analog-to-digital converter. Item 8 in FIG. 2 is a bushing to maintain the tip 4 in concentric alignment with the cone 3 attached to the tubing 1 of the stylus 20. The separator 5 shown in FIG. 2 can be used to separate the pressure detecting electronics 42 from the signal strength detecting electronics 32 in the stylus 20. The end 7 opposite from the tip 4 for the stylus 20 shown in FIG. 2, can optionally hold an optical input for optical character recognition by detector 107 or an optical input for bar code detection by detector 107. Alternately, the end 7 can hold a liquid crystal display 109 which will present a visual output to the user.

In another embodiment of the invention, the storage device 76 can be a read-only storage such as 104 in FIG. 3, which stores a personal identification number or a password or other security information, which can be transmitted from the stylus 20 to the digitizing display 22, for processing in the pen-based computer 74, to validate the stylus or the user of the stylus.

In another embodiment of the invention, an annunciator 109 such as a beeper or vibrator or LCD display device, can be connected to the storage device 76 or to the multiplexer 36. In this embodiment of the invention, the information received at the antenna 48 can be displayed by the annunciator device in the stylus 20.

Figure 5:
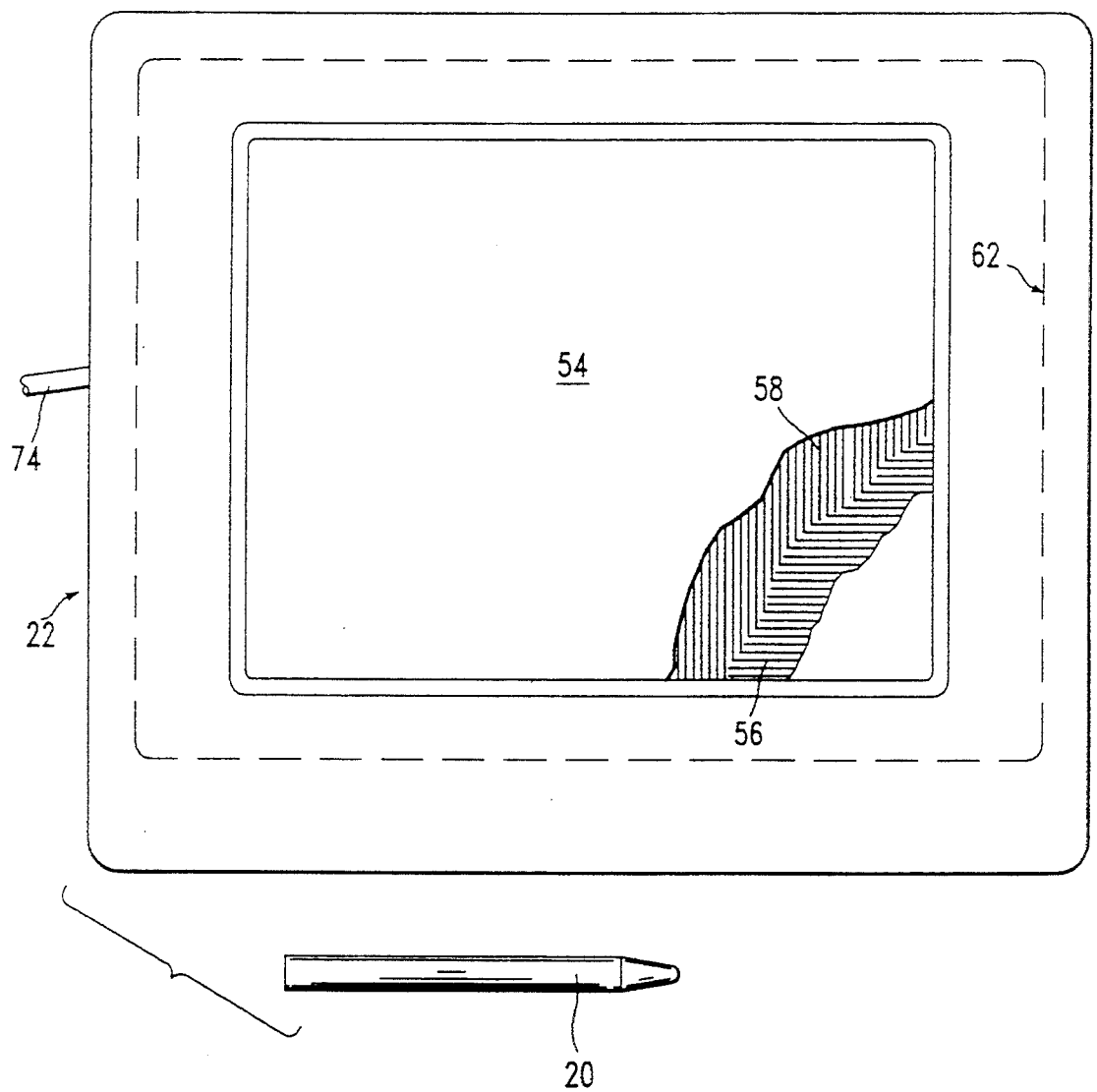
FIG. 5 is a top view and FIG. 6 is a side view of the workpad 22.
Figure 6:
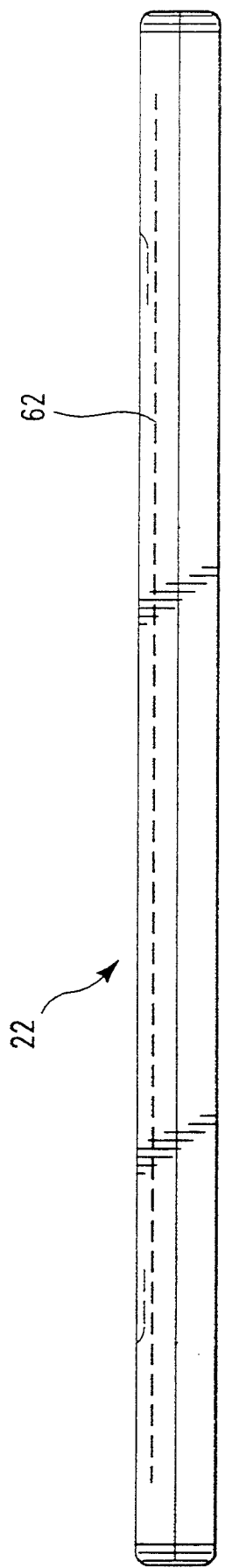

FIG. 5 shows a more detailed view of the workpad embodiment of the digitizing display 22 and the associated pickup stylus 20. FIG. 6 is a side view of the workpad 22. FIG. 5 and FIG. 6 show the relative location of the embedded antenna 62 within the housing of the workpad 22. It can be seen how the electrostatic tablet 54 with its horizontal and vertical conductors 56 and 58 are positioned in relation to the antenna 62. The wire 74 connects the workpad 22 to the pen-based computing system.

Although specific embodiments of the invention have been disclosed, it will be understood by those having skill in the art that changes can be made to those specific embodiments without departing from the spirit and the scope of the invention.

What is claimed is:

1. A data processing architecture for a pen-based computing system comprising: a stylus which includes a pressure sensing transducer and a X-Y position sensing transducer;

said pressure sensing transducer coupled to a multiplexer and said X-Y position sensing transducer also connected to said multiplexer;

a transmitter in said stylus having an input connected to said multiplexer, for transmitting a multiplexed data stream of information representing contact pressure applied to said pressure transducer and X-Y information representing the position of the stylus;

said system further comprising a digitizing display which includes an electrostatic tablet which radiates electromagnetic radiation which is detected by said X-Y position sensing transducer in said stylus;

a receiver located proximate said electrostatic tablet in said pen-based computer system, for receiving a multiplexed data stream transmitted from said stylus;

whereby an event of contacting said pressure transducer on the surface of said electrostatic tablet and establishing an X-Y position of said stylus with respect to said electrostatic tablet are transmitted from said stylus to said receiver;

a second transmitter in said digitizing display, in said pen-based computer system, for transmitting information to said stylus;

a second receiver in said stylus, for receiving information from said second transmitter in said digitizing display; and a utilization device in said stylus, coupled to said second receiver, for using information received from said digitizing display.

2. The system of claim 1 wherein said utilization device is a RAM and information stored therein is originated in said pen-based computer system.

3. The system of claim 1 wherein said utilization device is an annunciator device.

4. The system of claim 3 wherein said annunciator device is a liquid crystal display device.

5. The system of claim 3 wherein said annunciator device is a beeper device.

6. The system of claim 3 wherein said annunciator device is a vibrator device.

7. The system of claim 1 which further comprises:
   a personal identification number storage device in said stylus, having an output coupled to said multiplexer.

8. The system of claim 1 which further comprises:
   a random access memory in said stylus, which stores data which can be output to a multiplexer device coupled therewith.

9. The system of claim 1 which further comprises:
   an optical character recognition device in said stylus having an output coupled to said multiplexer.

10. The system of claim 1 which further comprises:
    a bar code reader device in said stylus, having an output coupled to said multiplexer.

11. The system of claim 1 which further comprises:
    a first antenna in said stylus coupled to said transmitter therein, for transmitting an electromagnetic signal from said stylus which contains said multiplexed data stream;
    a second antenna embedded proximate to said electrostatic tablet, for receiving said electromagnetic signal transmitted from said first antenna in said stylus, said second antenna being coupled to said receiver located proximate to said electrostatic tablet.

* * * * *